No. 704,586. Patented July 15, 1902.
M. H. SEXTON.
COFFEE POT.
(Application filed Apr. 30, 1902.)
(No Model.)

WITNESSES.
Rich. A. George
S. A. Brown.

INVENTOR
MICHAEL H. SEXTON.
By Milton E. Robinson
ATTORNEY.

UNITED STATES PATENT OFFICE.

MICHAEL H. SEXTON, OF UTICA, NEW YORK.

COFFEE-POT.

SPECIFICATION forming part of Letters Patent No. 704,586, dated July 15, 1902.

Application filed April 30, 1902. Serial No. 105,387. (No model.)

*To all whom it may concern:*

Be it known that I, MICHAEL H. SEXTON, of Utica, in the county of Oneida and State of New York, have invented certain new and useful Improvements in Coffee-Pots; and I do hereby declare that the following is a full, clear, and exact description of the invention, which will enable others skilled in the art to which it appertains to make and use the same, reference being had to the accompanying drawings, and to the figures of reference marked thereon, which form part of this specification.

The object of my invention is to provide an improved coffee-pot which is simple in its construction, accessible as to all its parts, and effective in separating the grounds from the liquid.

Figure 1:
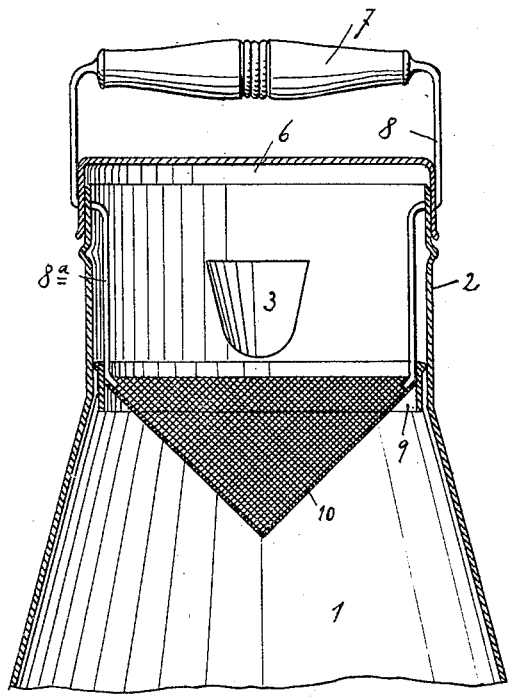
Figure 3:
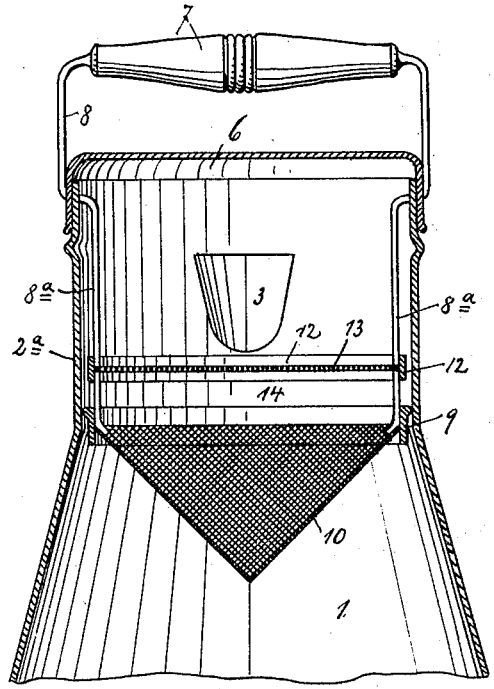
Figure 2:
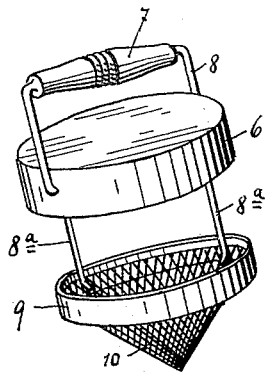
Figure 5:
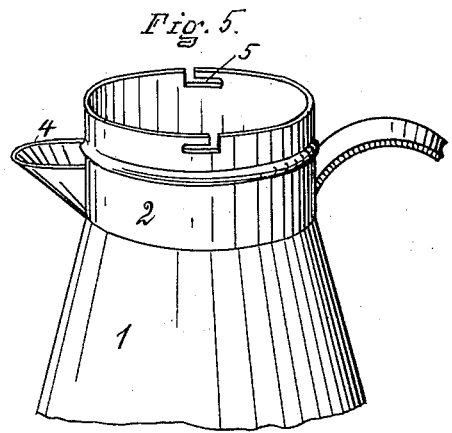
Figure 4:
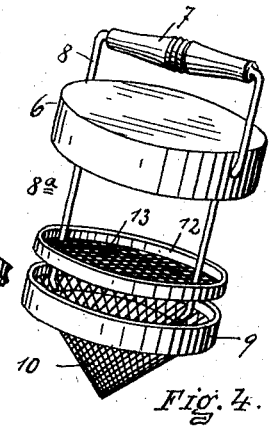

In the drawings, Figure 1 shows, on an enlarged scale, a vertical section of the upper portion of a coffee-pot embodying the features of my invention. Fig. 2 shows a perspective view of the cover and strainer portions removed from the body portion. Fig. 3 shows a vertical section, on an enlarged scale, of the upper portion of a coffee-pot embodying the features of my invention, together with a supplemental strainer employed in the construction. Fig. 4 shows a perspective view of the cover and strainer of this construction removed from the body. Fig. 5 shows a perspective view of the upper portion of the body with the cover and strainer removed.

Referring to the reference-figures in a more particular description, 1 indicates the body of the coffee-pot, which I prefer to make somewhat conical, although this is immaterial. The upper portion of the coffee-pot is provided with a cylindrical neck portion 2, in which is provided the discharge-opening 3, which on the outer side is provided with a spout 4. In the upper end of the cylinder portion there is also provided one set of members 5 of a bayonet-catch connection.

6 is a cover in the nature of a cap which sits over the upper end of the part 2. The cap is provided with a handle 7, which is connected to the cover by means of the wires 8, which extend partially down the side of the cap and then pass transversely in through the cap, and further providing an offset which acts as the other member of the bayonet-catch. These wires 8 are thence carried downward in arms 8ª and support the frame 9 of the conical strainer 10. The frame 9 fits the neck 2 of the coffee-pot closely, not necessarily liquid-tight, to prevent the passage of coffee-grounds, and this frame when the parts are assembled occupies a position below the opening 3 and in the lower portion of the neck 2. By giving a slight rotation to the cover by means of the handle 7 the bayonet-catch connection can be released and the cover and strainer removed. Access can then be had to the interior for filling and cleaning. When filled, the strainer and cover are placed in position and locked by means of the bayonet-catch. In discharging the contents through the spout the grounds are held back and strained out by means of the strainer 10, the grounds settling and accumulating during this operation between the side of the strainer and the side of the coffee-pot adjacent to the neck. They cannot accumulate in such quantities or in such a way as to choke the entire strainer. When the coffee-pot is brought into upright position, the grounds will drop into the bottom.

In the form of construction shown in Fig. 3 the arms 8ª, as well as the neck portion 2ª of the pot, are somewhat extended, making provision for the additional strainer-frame 12, which contains the plain disk strainer 13. There is an interval provided (indicated by 14) between the frames 9 and 12 in this construction, through which access may be had to the under surface of the upper strainer and the upper surface of the under strainer to remove any accumulations therein and to clean the same.

Other modifications than those herein suggested may be made without departing from the spirit of my invention.

What I claim as new, and desire to secure by Letters Patent, is—

1. The combination with a coffee-pot having a neck portion and a discharge-opening located in said neck portion, of a connected, removable cover and strainer, the strainer substantially fitting and being supported at such a distance below the cover as to take a position in the lower portion of said neck below the discharge-opening, substantially as set forth.

2. The combination of a coffee-pot having a neck portion, a discharge-opening in said neck portion, a cover, a lock or fastening for securing said cover, a strainer fitting said neck portion and supported from the cover at a point below the discharge-opening, and removable with the cover, substantially as set forth.

3. The combination of a coffee-pot having a cylindrical neck portion, a discharge-opening in said neck portion, a cover, an inverted, cone-shaped strainer supported from and removable with the cover arranged to occupy a position with the larger end of the strainer fitting the lower end of said neck, substantially as set forth.

4. In a coffee-pot, the combination of the body having a neck portion with a discharge-opening therein, a set of removable strainers fitting the neck below the discharge-opening and a cover connected with, and removable with said strainers, substantially as set forth.

In witness whereof I have affixed my signature, in presence of two witnesses, this 22d day of April, 1902.

MICHAEL H. SEXTON.

Witnesses:
E. WILLARD JONES,
S. A. BROWN.